US012623912B2

(12) United States Patent
Urbani et al.

(10) Patent No.: US 12,623,912 B2
(45) Date of Patent: May 12, 2026

(54) LITHIUM CARBONATE RECOVERY PROCESS

(71) Applicant: Cornish Lithium PLC, Penryn (GB)

(72) Inventors: Mark Daniel Urbani, Wattle Grove (AU); Gary Donald Johnson, Subiaco (AU); Nicholas John Vines, High Wycombe (AU)

(73) Assignee: CORNISH LITHIUM PLC, Penryn (GB)

( * ) Notice: Subject to any disclaimer, the term of this patent is extended or adjusted under 35 U.S.C. 154(b) by 402 days.

(21) Appl. No.: 18/030,241

(22) PCT Filed: Apr. 1, 2022

(86) PCT No.: PCT/AU2022/050297
§ 371 (c)(1),
(2) Date: Apr. 4, 2023

(87) PCT Pub. No.: WO2022/204766
PCT Pub. Date: Oct. 6, 2022

(65) Prior Publication Data
US 2023/0365421 A1    Nov. 16, 2023

(30) Foreign Application Priority Data
Apr. 1, 2021    (AU) ................................. 2021900980

(51) Int. Cl.
*C01D 7/26* (2006.01)
*C01D 7/07* (2006.01)
(52) U.S. Cl.
CPC ................. *C01D 7/26* (2013.01); *C01D 7/07* (2013.01)

(58) Field of Classification Search
None
See application file for complete search history.

(56) References Cited

U.S. PATENT DOCUMENTS 2,801,153 A * 7/1957 Dwyer .................... C22B 26/12
                                                          423/208
7,192,564 B2 3/2007 Cardarelli et al.
2011/0200508 A1 * 8/2011 Harrison ................ C01D 15/04
                                                          423/276
(Continued)

FOREIGN PATENT DOCUMENTS

CN        103318925 A        9/2013
GB         785979 A        11/1957
(Continued)

OTHER PUBLICATIONS

Han, B. et al: "Lithium carbonate precipitation by homogeneous and heterogeneous reactive crystallization" Hydrometallurgy 195 (2020) 105386 abstract; ch.2.2.1 and 3.1.1 and 3.1.2.
International Search Report and Written Opinion of the ISA issued in PCT/AU2022/050297, mailed May 16, 2022; ISA/AU.
(Continued)

*Primary Examiner* — John J Figueroa
(74) *Attorney, Agent, or Firm* — Harness, Dickey & Pierce, P.L.C.

(57)    ABSTRACT
A process for the recovery of lithium carbonate from a solution (1) containing a mixture of lithium sulfate and lithium hydroxide, the process comprising the precipitation of lithium carbonate (3) from the solution (1) containing a mixture of lithium sulfate and lithium hydroxide through the addition of carbon dioxide (2).

6 Claims, 1 Drawing Sheet

(56)          References Cited

U.S. PATENT DOCUMENTS

| | | |
|---|---|---|
| 2013/0251610 A1 | 9/2013 | Kawata et al. |
| 2017/0233848 A1* | 8/2017 | Johnson ................ C01F 7/0686 |
| | | 75/743 |
| 2020/0078796 A1* | 3/2020 | Kochhar ................. C22B 1/005 |
| 2020/0232105 A1 | 7/2020 | Snydacker et al. |
| 2021/0024362 A1 | 1/2021 | Bourassa et al. |
| 2021/0197169 A1 | 7/2021 | Sakuma |

FOREIGN PATENT DOCUMENTS

| | | | |
|---|---|---|---|
| JP | 2004508694 A | 3/2004 |
| JP | 2004196607 A | 7/2004 |
| JP | 2020132950 A | 8/2020 |
| RU | 2560359 C2 | 8/2015 |
| WO | WO-2020160615 A1 | 8/2020 |

OTHER PUBLICATIONS

European Search Report dated Nov. 25, 2024 Regarding Application No. / Patent No. 22778221.6-1014/4178913 PCT/AU2022050297 (7 Pages).
Purification of Industrial Grade Lithium Chloride for the Recovery of High Purity Battery Grade Lithium Carbonate, article authored by: Nicholas Linneen, Ramesh Bhave, and Dougls Woerner, May 2019, vol. 214, pp. 168-173 (6 Pages).
Chinese First Office Action dated Oct. 31, 2025 regarding counterpart CN Application No. 202280007259.
Japanese Office Action for Japanese Patent Application No. 2023-523660 (with English translation) dated Jan. 6, 2026 (16 pages).

* cited by examiner

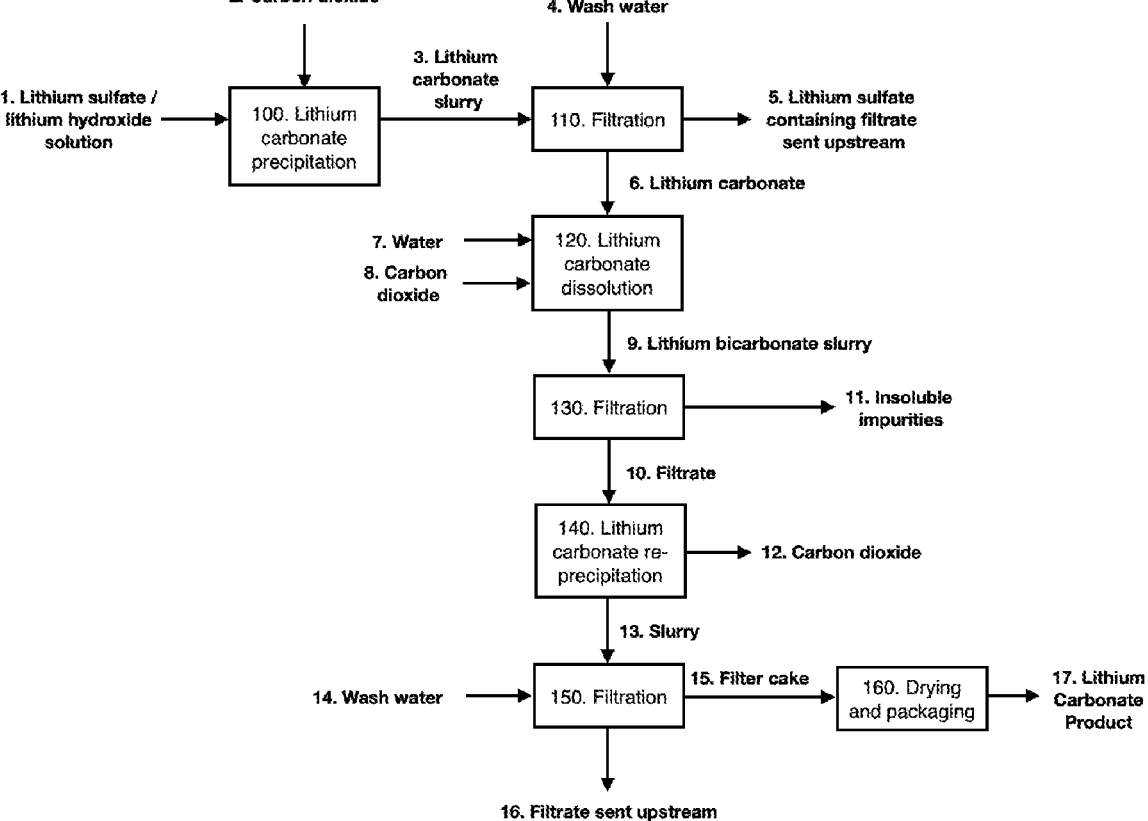

LITHIUM CARBONATE RECOVERY PROCESS

CROSS-REFERENCE TO RELATED APPLICATIONS

This application is a 371 U.S. National Phase of International Application No. PCT/AU2022/050297, filed Apr. 1, 2022, which claims priority to Australian Provisional Patent Application No. 2021900980, filed Apr. 1, 2021. The entire disclosures of the above applications are incorporated herein by reference.

FIELD OF THE INVENTION

The present invention relates to a process for the recovery of lithium carbonate from solutions containing lithium sulfate and lithium hydroxide. More particularly, the process of the present invention is intended to allow the recovery and separation of lithium carbonate from solutions containing sulfate anions.

The process of the present invention consists of a novel combination of operating steps, one or more of which may have been used commercially, in other combinations and for other purposes, in mineral processing and hydrometallurgical processes.

BACKGROUND ART

The major sources of commercially mined lithium have historically come from brine solution and hard rock spodumene containing ores. For processes that recover lithium from hard rock ores, the conventional approach is to convert alpha spodumene to beta spodumene by high temperature (>800° C.) decrepitation. The conversion enables chemical attack and subsequent extraction of lithium using sulfuric acid.

Post a series of impurity removal stages, lithium, which is present in solution as soluble lithium sulfate, is subsequently recovered as lithium carbonate through the addition of sodium carbonate as a precipitation reagent. The addition of sodium carbonate produces a slurry containing lithium carbonate precipitates from solution and sodium sulfate resides largely in the liquor.

After separation of lithium carbonate by solid liquid separation, sodium sulfate is recovered from solution by a double crystallisation process. Recovery of sodium sulfate is necessary for this process to provide an outlet for sodium in the process.

The first stage of sodium sulfate recovery involves the crystallisation of a hydrous sodium sulfate, commonly termed Glauber's salt, and by forced cooling of the liquor. To afford acceptable recoveries of sodium sulfate, the liquor must be cooled, generally to <10° C. The resultant slurry is subjected to solid liquid separation and washing to enable the recovery of lithium in the liquor. The second stage involves the melting of Glauber's salt and crystallisation of anhydrous sodium sulfate at elevated temperature. The resultant slurry is subject to solid liquid separation, and the residue is dried and packaged.

The recovery of lithium carbonate through this process is both operating and capital cost intensive. Of more significant concern is the potential oversupply of sodium sulfate as the demand for lithium chemicals increases. The inability to store sodium sulfate, which is highly water soluble, may potentially inhibit the use of sodium carbonate as a precipitation reagent for lithium carbonate.

In International Patent Application PCT/AU2020/050090, a process is described in which a solution containing lithium sulfate is reacted with lime and aluminium hydroxide, in which sulfate precipitates in the form of ettringite. The resulting liquor consists of a solution containing lithium hydroxide and lithium sulfate. The conversion of separation of lithium hydroxide from lithium sulfate is conducted via direct crystallisation of lithium hydroxide monohydrate. Although the crystallisation stage is selective, sulfate is the main contaminant in the product. Several purification processes are required to produce a saleable lithium product. The purification processes require precipitation reagents and evaporative crystallisation.

The recovery process of the present invention has as one object thereof to substantially overcome the problems associated with the prior art or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia or any other country or region as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a process for the recovery of lithium carbonate from a solution containing a mixture of lithium sulfate and lithium hydroxide, the process comprising the precipitation of lithium carbonate from the solution containing a mixture of lithium sulfate and lithium hydroxide through the addition of carbon dioxide.

Preferably, a slurry resulting from the precipitation of lithium carbonate is passed to solid liquid separation, and preferably washing, to remove entrained liquor from the lithium carbonate.

Preferably, the liquor from solid liquid separation and/or washing contains lithium sulfate and some minor impurities. The liquor, containing lithium sulfate, is directed to a process to convert lithium sulfate to lithium hydroxide and thereby improve the recovery of lithium.

In one form of the present invention, lithium carbonate is precipitated at atmospheric pressure.

Preferably, lithium carbonate is precipitated at a temperature of between ambient to about 100° C.

Still preferably, lithium carbonate is precipitated at greater than about 50° C.

In one form of the present invention the lithium precipitation occurs over a residence time of about 2 hours.

In a further form of the present invention the lithium precipitation achieves a precipitation extent of about 90% of the stoichiometric mass of lithium hydroxide contained in the solution containing both lithium sulfate and lithium hydroxide.

Preferably, lithium carbonate is precipitated with the addition of in excess of stoichiometric carbon dioxide addition.

In one form of the present invention the process comprises the method steps of:

a) Precipitation of lithium carbonate from a solution containing lithium sulfate and lithium hydroxide through the addition of carbon dioxide;
b) Solid liquid separation and preferably washing of the precipitated lithium carbonate to recover a liquor containing lithium sulfate;
c) Recycle of the liquor to a subsequent step to convert lithium sulfate to lithium hydroxide;
d) Purification of the lithium carbonate by pulping in water and addition of carbon dioxide to produce lithium bicarbonate solution;
e) Solid liquid separation to remove insoluble impurities;
f) Heating the lithium bicarbonate solution to strip carbon dioxide and re-precipitate lithium carbonate; and
g) Solid liquid separation, drying and packing of the purified lithium carbonate product.

Preferably, the lithium carbonate precipitation step is operated in a temperature range of between ambient to about 100° C., and preferably at atmospheric pressure.

Still preferably, the lithium carbonate precipitation step a) is operated at greater than about 50° C. and at atmospheric pressure.

In a still further form of the present invention, lithium carbonate is precipitated at between about 50° C. to 100° C. and at atmospheric pressure.

In one form of the present invention the lithium precipitation occurs over a residence time of about 2 hours.

In a further form of the present invention the lithium precipitation achieves a precipitation extent of about 90% of the stoichiometric mass of lithium hydroxide contained in the solution containing both lithium sulfate and lithium hydroxide.

Preferably, the lithium carbonate precipitation step (i) comprises the addition of in excess of stoichiometric carbon dioxide addition.

BRIEF DESCRIPTION OF THE DRAWINGS

The process of the present invention will now be described, by way of example only, with reference to one embodiment thereof and the accompanying drawings, in which:—

FIG. 1 is a flow sheet depicting a process for the recovery of lithium carbonate from a solution containing lithium hydroxide and lithium sulfate containing liquor in accordance with the present invention.

BEST MODE(S) FOR CARRYING OUT THE INVENTION

The present invention provides a process for the recovery of lithium carbonate from a solution containing a mixture of lithium sulfate and lithium hydroxide, the process comprising the precipitation of lithium carbonate from the solution containing a mixture of lithium sulfate and lithium hydroxide through the addition of carbon dioxide.

The addition of carbon dioxide to the solution containing both lithium sulfate and lithium hydroxide enables the separation of lithium from sulfate, and provides corresponding higher separation efficiency than the prior art.

The precipitation chemistry for lithium carbonate is shown as follows:

$$2LiOH_{(aq)}+CO_{2(g)} \rightarrow Li_2CO_{3(g)}+H_2O_{(aq)}$$

The slurry resulting from the precipitation of lithium carbonate is subject to solid liquid separation, and washing, to remove entrained liquor from the lithium carbonate.

The liquor from solid liquid separation and washing contains lithium sulfate and some minor impurities. The liquor, which contains lithium sulfate, is directed to a process to convert lithium sulfate to lithium hydroxide and to improve the recovery of lithium.

Lithium carbonate is precipitated at a temperature of between ambient to about 100° C., for example about 20° C. to 100° C. and at atmospheric pressure.

In one form of the present invention, lithium carbonate is precipitated at atmospheric pressure.

In one form of the present invention, lithium carbonate is precipitated at greater than about 50° C.

In a further form of the present invention, lithium carbonate is precipitated at between about 50° C. to 100° C.

In a still further form of the present invention the lithium precipitation occurs over a residence time of about 2 hours.

In a yet still further form of the present invention the lithium precipitation achieves a precipitation extent of about 90% of the stoichiometric mass of lithium hydroxide contained in the solution containing both lithium sulfate and lithium hydroxide.

Lithium carbonate is precipitated with the addition of in excess of stoichiometric carbon dioxide addition.

In one form the present invention provides a process for the recovery of lithium carbonate from a solution containing lithium sulfate and lithium hydroxide, the process comprising the method steps of:

a) Precipitation of lithium carbonate from a solution containing lithium sulfate and lithium hydroxide through the addition of carbon dioxide;
b) Solid liquid separation and washing of the precipitated lithium carbonate to recover a liquor containing lithium sulfate and solids containing lithium carbonate; and
c) Recycle of the liquor post the solid liquid separation step (ii) to a preceding stage that converts lithium sulfate to lithium hydroxide.

The separation of the precipitated lithium carbonate from the liquor is achieved by filtration or decantation, and the resulting filtrate contains the large majority (greater than about 90%) of lithium sulfate contained in the liquor.

Washing of the lithium carbonate substantially removes entrained impurities and lithium sulfate.

In one embodiment of the process of the present invention, a lithium sulfate and lithium hydroxide containing liquor is treated in accordance with the present invention as shown in FIG. 1.

In FIG. 1 there is shown a flow sheet in accordance with the present invention and in which the embodiment depicted is particularly intended for the processing of lithium sulfate and lithium hydroxide containing liquor to recover lithium as lithium carbonate 17.

A lithium sulfate and lithium hydroxide containing solution 1 is directed to a lithium carbonate precipitation step 100 operating at 20-100° C. and atmospheric pressure. Carbon dioxide 2 is added to precipitation step 100 to precipitate lithium carbonate. The precipitation step 100 proceeds over a retention time of about 2 hours and achieves a precipitation extent of about 90% of the stoichiometric mass of lithium hydroxide contained in the solution containing both lithium sulfate and lithium hydroxide 1.

A resulting lithium carbonate slurry 3 is directed to a filtration step 110, for example a vacuum filter, which enables the lithium carbonate slurry 3 to be filtered. A filter cake is washed with water 4 to remove lithium sulfate entrained in the filter cake to the filtrate 5.

The lithium sulfate containing filtrate 5 is directed to a preceding stage that converts lithium sulfate to lithium hydroxide.

Lithium carbonate filter cake 6 is re-pulped in water 7 and carbon dioxide 8 is added in the lithium carbonate dissolution stage 120 to dissolve lithium carbonate. A resultant slurry 9 is directed to a solid liquid separation stage 130 to separate a lithium bicarbonate solution 10, or filtrate, from insoluble impurities 11.

The lithium bicarbonate solution 10 is directed to a lithium carbonate re-precipitation stage 140, in which the liquor is heated to strip carbon dioxide 12 and lithium carbonate subsequently precipitates. A precipitation slurry 13 is directed to a filtration step 150 utilising, for example, as a centrifuge. A centrifuge cake is washed with water 14 to remove impurities. A lithium carbonate filter cake 15 is removed from the centrifuge and directed to a drying and packaging step 160.

The filtrate 16 from the filtration step 150 contains lithium carbonate in solution. This filtrate 16, or liquor, is recycled upstream to enable a high recovery of lithium to the lithium carbonate product 17.

As can be seen from the above description, the process of the present invention provides a process in which carbon dioxide is added to a solution containing both lithium sulfate and lithium hydroxide, thereby enabling the separation of lithium from sulfate, and in turn providing corresponding higher separation efficiency than the prior art.

Modifications and variations such as would be apparent to the skilled addressee are considered to fall within the scope of the present invention.

The invention claimed is:

1. A process for the recovery of lithium carbonate from a solution containing a mixture of lithium sulfate and lithium hydroxide, the process comprising the steps of:

a) Precipitation of lithium carbonate from a solution containing lithium sulfate and lithium hydroxide through the addition of carbon dioxide;

b) Solid liquid separation and optionally washing of the precipitated lithium carbonate to recover a liquor containing lithium sulfate;

c) Recycle of the liquor to a subsequent step to convert lithium sulfate to lithium hydroxide;

d) Purification of the lithium carbonate by pulping in water and addition of carbon dioxide to produce lithium bicarbonate solution;

e) Solid liquid separation of the lithium bicarbonate solution to remove insoluble impurities;

f) Heating the lithium bicarbonate solution to strip carbon dioxide and re-precipitate lithium carbonate; and g) Solid liquid separation, drying and packing of the purified lithium carbonate product.

2. The process of claim 1, wherein the lithium carbonate precipitation step a) is operated at atmospheric pressure.

3. The process of claim 1, wherein the lithium carbonate precipitation step a) is operated in a temperature range of:

a. between ambient to about 100° C.;

b. greater than about 50° C.; or c. between about 50° C. to 100° C.

4. The process of claim 1, wherein the lithium carbonate precipitation step a) occurs over a residence time of about 2 hours.

5. The process of claim 1, wherein the lithium carbonate precipitation step a) achieves a precipitation extent of about 90% of the stoichiometric mass of lithium hydroxide contained in the solution containing both lithium sulfate and lithium hydroxide.

6. The process of claim 1, wherein the lithium carbonate precipitation step a) comprises the addition of in excess of stoichiometric carbon dioxide addition.

* * * * *